(12) United States Patent
Palmer et al.

(10) Patent No.: US 7,243,347 B2
(45) Date of Patent: Jul. 10, 2007

(54) METHOD AND SYSTEM FOR MAINTAINING FIRMWARE VERSIONS IN A DATA PROCESSING SYSTEM

(75) Inventors: Rodney Wendell Palmer, Minneapolis, MN (US); Gregory Brian Pruett, Raleigh, NC (US); David Benson Rhoades, Apex, NC (US); Ileana Vila, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 715 days.

(21) Appl. No.: 10/176,699

(22) Filed: Jun. 21, 2002

(65) Prior Publication Data

US 2003/0236970 A1    Dec. 25, 2003

(51) Int. Cl.
*G06F 9/44* (2006.01)
(52) U.S. Cl. ..................................... 717/170; 717/168
(58) Field of Classification Search ........ 717/168–178; 707/203; 713/2
See application file for complete search history.

(56) References Cited

U.S. PATENT DOCUMENTS

| | | | |
|---|---|---|---|
| 5,293,556 A | 3/1994 | Hill et al. | |
| 5,355,489 A * | 10/1994 | Bealkowski et al. | 713/2 |
| 5,561,760 A | 10/1996 | Ferris et al. | |
| 5,566,335 A * | 10/1996 | Nash et al. | 713/1 |
| 5,818,343 A | 10/1998 | Sobel et al. | |
| 5,835,760 A * | 11/1998 | Harmer | 713/2 |
| 5,892,973 A | 4/1999 | Martinez et al. | |
| 6,003,130 A * | 12/1999 | Anderson | 713/2 |
| 6,154,728 A | 11/2000 | Sattar et al. | |
| 6,199,194 B1 * | 3/2001 | Wang et al. | 717/118 |
| 6,262,493 B1 | 7/2001 | Garnett | |
| 6,360,362 B1 * | 3/2002 | Fichtner et al. | 717/168 |
| 6,487,464 B1 * | 11/2002 | Martinez et al. | 700/79 |
| 6,604,194 B1 * | 8/2003 | Nam | 713/2 |
| 6,633,976 B1 * | 10/2003 | Stevens | 713/2 |
| 6,678,741 B1 * | 1/2004 | Northcutt et al. | 709/248 |
| 6,725,178 B2 * | 4/2004 | Cheston et al. | 702/186 |
| 6,789,215 B1 * | 9/2004 | Rupp et al. | 714/38 |
| 6,836,859 B2 * | 12/2004 | Berg et al. | 714/36 |
| 2002/0073304 A1 * | 6/2002 | Marsh et al. | 713/1 |
| 2003/0028800 A1 * | 2/2003 | Dayan et al. | 713/200 |
| 2003/0172228 A1 * | 9/2003 | Chu et al. | 711/173 |
| 2004/0015952 A1 * | 1/2004 | Lajoie et al. | 717/171 |

* cited by examiner

*Primary Examiner*—William H. Wood
(74) *Attorney, Agent, or Firm*—H. Artoush Ohanian; Cynthia S. Byrd; Biggers & Ohanian, LLP

(57) ABSTRACT

A data processing method and system according to the present invention in which a mass storage device (DASD) of a data processing system is partitioned to include a service partition. The service partition includes the current versions of peripheral device firmware, any BIOS extensions, and device drivers. During a system boot, the boot code will compare the firmware versions of all the peripheral devices against the archived firmware versions stored in the service partition. If a mismatch is detected, the system boot will typically force an update of the peripheral device firmware to the level that is known to be good. Any such firmware updates are recorded in a log that is accessible to system management applications. Any revisions to firmware may be imaged into the service partition so that the revised version will be incorporated into the peripheral device itself during the next subsequent system boot.

12 Claims, 3 Drawing Sheets

METHOD AND SYSTEM FOR MAINTAINING FIRMWARE VERSIONS IN A DATA PROCESSING SYSTEM

BACKGROUND

1. Field of the Present Invention

The present invention generally relates to the field of data processing systems and more particularly to a data processing system employing a partitioned disk capable of storing firmware versions for maintaining revision levels of the system's firmware based components.

2. History of Related Art

In the field of microprocessor-based data processing systems, one or more processors typically communicate with a system memory via a proprietary and implementation specific system bus. A bridge typically provides an interface between the system bus and one or more I/O bus (also referred to as a peripheral bus). The I/O bus is typically compliant with an industry standard I/O bus protocol such as the widely implemented Peripheral Components Interface (PCI) bus. The I/O bus enables a wide variety of peripheral devices to communicate with the system's processor(s) and system memory. Devices that may be attached to an I/O bus in a typical data processing system include, as examples, hard disk controllers, graphic adapters, and network interface cards. High end systems may further include peripherals such as service processors and RAID controllers.

The providers of peripheral devices for microprocessor-based systems may include firmware and/or BIOS extensions with their devices to provide expanded functionality. BIOS (Basic I/O System) is a well known term that refers generally to code that is executed immediately following system power-on to enable system control of various I/O devices including the keyboard, display screen, disk drives, serial communications, and so forth. The BIOS code also typically performs an Initial Program Load (IPL) that copies operating system code (or portions thereof) from a system disk or other peripheral device to system memory. As its name implies, a BIOS extension enables an adapter manufacturer to define device specific code that is invoked via the system BIOS typically after the execution of a power on self test (POST) and before the IPL. BIOS extensions may be provided via an optional ROM device on the peripheral device. Peripheral device firmware refers to code designed specifically for the adapter. Firmware may, for example, include code that tells the adapter card how to execute commands received from a device driver.

Peripheral device firmware, BIOS extensions, and device drivers may all be revised, updated, or otherwise modified from time to time. When a firmware revision level is modified, the modifications must be verified for functionality. If the firmware revision level, BIOS version, or device driver is subsequently modified to incompatible levels, the system may not perform as expected. In a worst case scenario, a combination of firmware, BIOS, and device driver will not exhibit an obvious failure, but may result in a failure and/or lost data at some point in the future.

These compatibility issues often manifest themselves following a field service event that includes a field replacement of one or more peripheral devices, also referred to herein as field replaceable units (FRU's). Service technicians are trained to make sure that a system's firmware, BIOS, and device drivers are all compatible following any field service. Unfortunately, this level of verification is not adhered to strictly because of factors including inadequate time to perform the field service action, lack of access to the Internet during field service, and the elements of human error when dealing with large numbers of systems in a very time sensitive environment. It would, therefore, be highly desirable to implement a method and system that insured compatibility among various system software components following a field service event in which one or more peripheral devices are replaced or updated. It would be further desirable if the implemented solution operated automatically without requiring any substantial interaction with the field service technician.

SUMMARY OF THE INVENTION

The problem identified above is, in large measure, addressed by a data processing method and system according to the present invention in which a mass storage device (DASD) of a data processing system is partitioned to include a service partition. The service partition is typically located on a portion of the DASD that is inaccessible to the operating system and application programs via various methods including abstraction to the media by the hardware interface or via a separate partition on the DASD which is in a format that is unrecognizable to the currently running Operating System. The service partition will typically include the current versions of peripheral device firmware, any BIOS extensions, and device drivers. During a system boot, the boot code will invoke a peripheral device call that reports the device's firmware version level to compare the firmware versions of all the peripheral devices against the archived firmware versions stored in the service partition. If a mismatch is detected, the system boot will typically force an update of the peripheral device firmware to the level that is known to be good. Any such firmware updates are recorded in a log that is accessible to system management applications. Any revisions to firmware may be imaged into the service partition so that the revised version will be incorporated into the peripheral device itself during the next subsequent system boot.

BRIEF DESCRIPTION OF THE DRAWINGS

Other objects and advantages of the invention will become apparent upon reading the following detailed description and upon reference to the accompanying drawings in which.

Figure 1A:
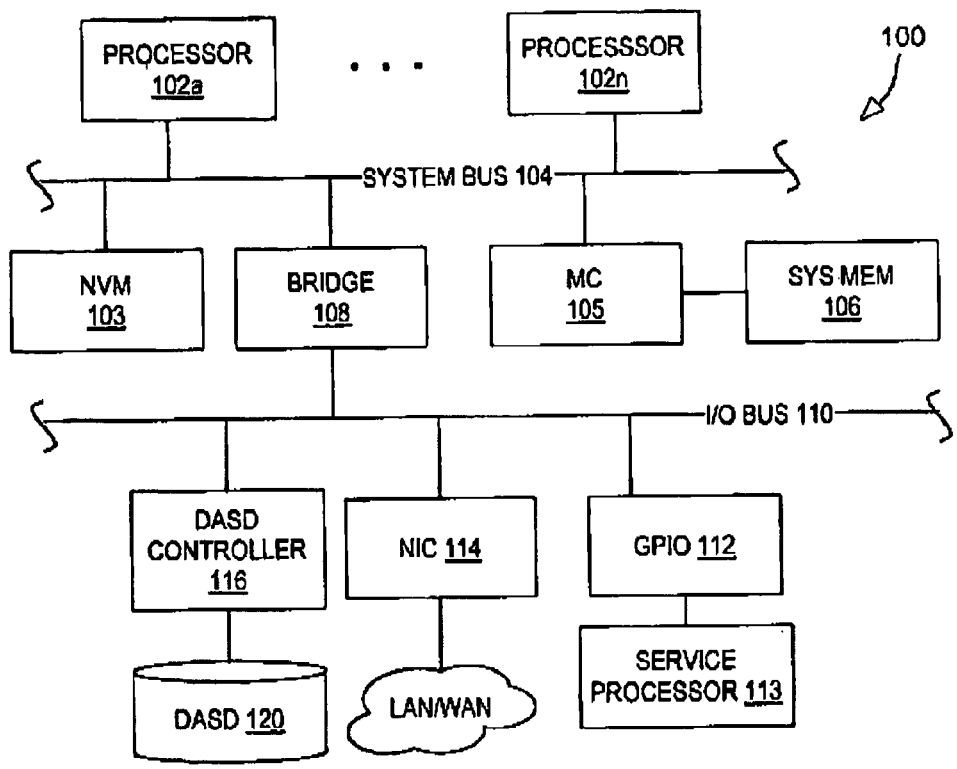
FIG. 1A is block diagram of selected portions of a data processing system suitable for implementing the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Turning now to FIG. 1A of the drawings, a block diagram of selected features of a data processing system 100 suitable for implementing the present invention is depicted. In the depicted embodiment, system 100 includes a set of two or more main processors 102a through 102n (generically or collectively referred to as processor(s) 102) that are each connected to a system bus 104. Processors 102 are typically implemented with commercially distributed general purpose microprocessors including as examples, the PowerPC® family of processors from IBM Corporation or x86-type processors such as the Pentium® family of processors from Intel Corporation.

A non-volatile memory (NVM) device 103 containing the system BIOS code is connected to system bus 104. NVM 103 is typically implemented as a flash memory card or other electrically erasable and programmable storage device. In addition, a system memory 106 is accessible to each processor 102 through an intervening memory controller (MC) 105 via system bus 104. Because each processor 102 baa substantially equal access to system memory 106 such that the memory access time is substantially independent of the processor, the depicted embodiment of system 100 is an example of a symmetric multiprocessor (SMP) system. It will be appreciated however, that the present invention may be suitably implemented on systems with different architectures including, as examples, uni-processor systems and non-uniform memory access (NUMA) multi-processor systems.

In the depicted embodiment of system 100, a bus bridge 108 provides an interface between system bus 104 and an I/O bus 110 to which one or more peripheral devices are connected. I/O bus 110 is typically compliant with one of several industry standard I/O bus specifications including, as an example, the Peripheral Components Interface (PCI) bus as specified in *PC/Local Bus Specification Rev* 2.2 by the PCI Special Interest Group (www.pcisig.com). Bus bridge 108 and memory controller 105 may be implemented with a chip set specifically designed for use with processors 102 and system bus 104.

The peripheral devices connected to I/O bus 110 may include, as examples, a high-speed network adapter or network interface card (NIC) 114 through which system 100 is connected to a data processing network such as a local area network (that may itself be connected to a wide area network such as the Internet), a DASD controller 116 to which a DASD 120 is connected, and a general purpose I/O adapter 112 to which a service processor 113 is connected.

In one embodiment, DASD controller 116 and DASD 120 are AT-attached (ATA) compliant devices also commonly referred to as IDE devices as specified in the ANSI National Committee for Information Technology Standardization (NCITS) 317-1998. ATA hard disks comprise the primary boot device in a vast majority of desktop and laptop class personal computers. In other embodiments, DASD 120 may be implemented as a SCSI disk drive controlled by a SCSI host adapter or as a redundant array of inexpensive disks (RAID) where DASD controller 116 represents a RAID controller.

Figure 1B:
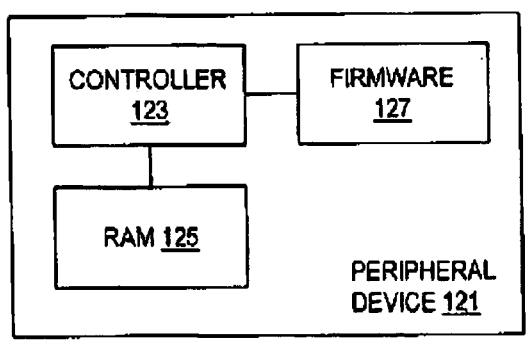
FIG. 1B is a block diagram illustrating selected elements of a peripheral device used in the data processing system of FIG. 1A.

Referring now to FIG. 1B, a simplified block diagram of selected elements of a generic peripheral device 121 suitable for use in data processing system 100 is shown. Peripheral device 121 is intended to represent any of the specific peripheral devices used in system 100. As such, the elements of peripheral device 121 are common to DASD controller 116, NIC 114, and service processor 113 and include an embedded controller 123, a randomly accessible and typically volatile memory (RAM) 125, and non-volatile code identified as firmware 127. Firmware 127 represents device specific instruction sequences executed by controller 123 that define the manner in which peripheral device 121 interacts with the host system. When system 100 issues an I/O command via a particular device driver, the device's firmware translates the device driver call into a set of commands executable by controller 123. Firmware 127 is typically stored in a non-volatile storage device such as a ROM or flash memory card. In addition to the device's firmware, this non-volatile device may further include internally stored identification (ID) information that may be accessed via I/O bus 110 to identify the peripheral.

As illustrated already with respect to firmware 127, portions of the present invention may be implemented as a set of computer executable instructions (software) stored on a computer readable medium such as system memory 106, a cache memory (not depicted) of a processor 102, NVM 103, a floppy diskette, hard disk, CD ROM, DVD, magnetic tape, or other suitable storage element.

Figure 2:
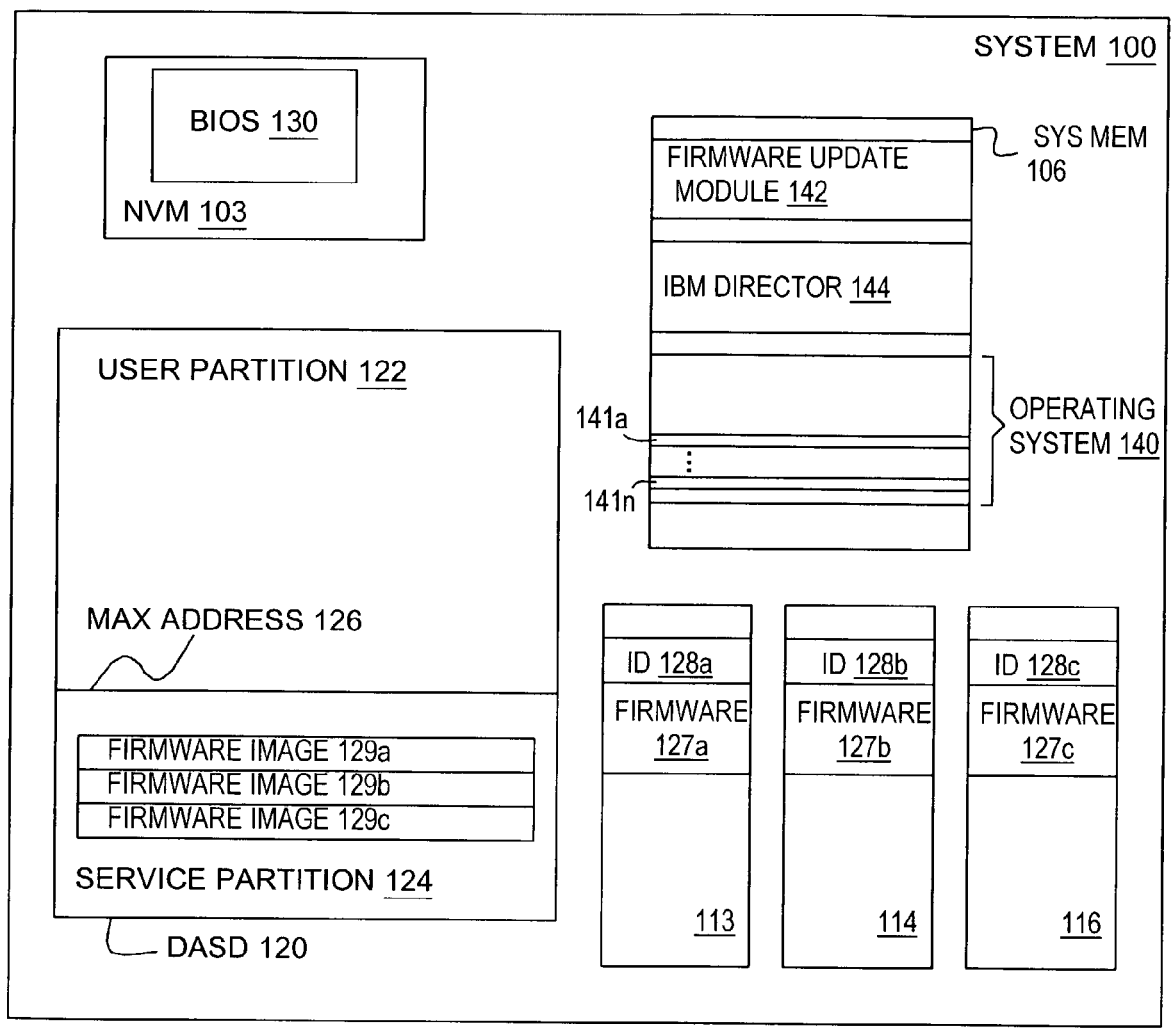
FIG. 2 is a conceptual representation of the organization of a direct access storage device according to one embodiment of the present invention.

Referring to FIG. 2, a conceptual depiction of selected software modules that may comprise a portion of system 100 are depicted. In the depicted embodiment, NVM 103 contains BIOS code 130 that is invoked or executed each time system 100 is powered on or reset. BIOS code 130 is typically configured to establish a low-level abstraction layer to the hardware interface for the operating system, to execute the system's POST, and to copy at least a portion of the operating system from DASD 120 into system memory 106. In addition, BIOS code 130 is configured to identify each peripheral device connected to I/O bus 110 (shown in FIG. 1A) by its corresponding device identification information represented in FIG. 2 by reference numeral 128.

Following the successful completion of the POST, BIOS 130 according to one embodiment the present invention is configured to determine if a BIOS extension file exists for each of the identified peripheral devices. If system BIOS 130 detects a BIOS extension file corresponding to an identified peripheral device, BIOS 130 validates the file and copies portions of valid extension files into a portion of system memory 106. The loading of BIOS extension files may be accomplished in the manner described in the U.S. patent application entitled, Use of Hidden Partitions in a Storage Device for Storing Bios Extension Files, Ser. No. 10/050,032 filed Jan. 15, 2002, and assigned to a common assignee with this application.

BIOS 130 typically further includes an Initial Program Load (IPL) component that is configured to retrieve at least portions of an operating system 140 into system memory 106. Typically, the IPL retrieves core or kernel portions of operating system 140 needed to establish paging tables, segment descriptors, and other memory management modules. In addition, the IPL may be configured to retrieve one or more peripheral device drivers identified by reference numerals 141a through 141n. Each peripheral device of system 100 typically requires a device driver 141 that enables operating system to control the peripheral device.

FIG. 2 further illustrates selected software components of peripheral devices 113, 114, and 116. More specifically, the peripheral devices in the illustrated embodiment of system 100 include peripheral device identification codes identified by reference numerals 128a through 128c and peripheral device firmware identified by reference numerals 127a through 127c. In addition, FIG. 2 illustrates firmware images 129a through 129c stored in a service partition 124 of DASD 120 as well as a firmware update module 142 and a director 144 stored in system memory 106. These components will be described in greater detail below.

Generally speaking, the invention emphasizes a system and method for maintaining images or copies of the latest peripheral device firmware in local storage and, more particularly, in a dedicated partition of the system's DASD. Following a field service event in which one or more field replaceable devices is replaced, the system can automatically verify the firmware versions of any newly installed peripheral devices. If a firmware version mismatch is detected, the system can take corrective action by updating the firmware on the peripheral device from locally stored image. If a peripheral device firmware is updated, the updated version is imaged into the dedicated partition for future verification. In this manner, the task of maintaining correct firmware is automated thereby relieving field service technicians from the responsibility of maintaining correct firmware levels for every peripheral device on every machine.

To facilitate the local storage of firmware versions, the embodiment of DASD 120 depicted in FIG. 2 is logically partitioned into at least two partitions identified in the figure as user partition 122 and service partition 124. As its name implies, user partition 122 identifies a portion of DASD 120 that is available to the operating system and application programs. Service partition 124 represents a "hidden" portion of DASD 120 that is generally inaccessible to the operating system and any applications running under it. Service partition 124 may be configured by invoking a SET MAX ADDRESS command that configures the highest logical block address of DASD 120 that the operating system may access. One method of using the SET MAX ADDRESS command to partition DASD 120 is more fully described in the Protected Area Run Time Interface Extension Services (PARTIES) internal working document, or its successor document(s), of the American National Standards Institute (ANSI). BIOS 130 may be configured to determine the boundaries of user partition 122 (generally from logical block address 0 to MAX ADDRESS 126) and service partition 124 (generally from MAX ADDRESS 126 and above). One embodiment of the invention uses service partition 124 in DASD 120 to store local copies of firmware for one or more of the peripheral devices connected to system 100.

To achieve the local storage of current firmware versions and the automated verification of firmware following field service events, the invention incorporates a firmware update module identified by reference numeral 142 and facilities or means for querying the current firmware versions or levels of each peripheral device on the system. In one embodiment, BIOS 130 invokes a novel system call enabling peripheral device hardware to report firmware levels during POST to gather the firmware levels on all of the hardware that is actually installed on the system. These retrieved values are then compared to the version levels of the firmware images archived in the DASD. If POST detects a firmware level mismatch, BIOS 130 may force a boot into the service partition to correct the mismatch by reprogramming or updating the firmware of any mismatched devices and maintaining an update log within the partition for access by management applications. When the system is subsequently re-booted, the firmware on each peripheral device will comply with the corresponding device driver version.

Figure 3:
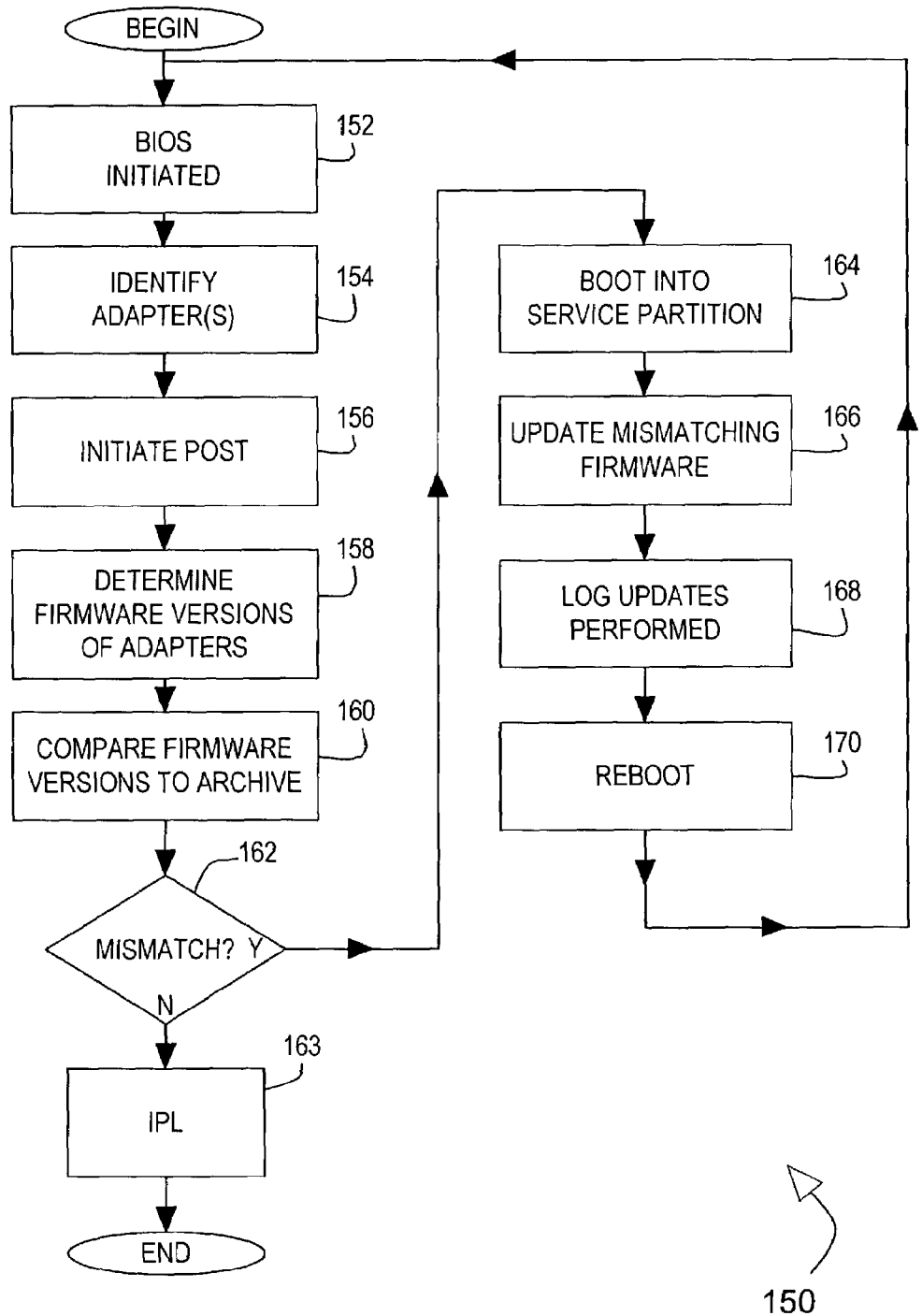
FIG. 3 is a flow diagram illustrating a method of using BIOS extension files in a data processing system.

Referring now to FIG. 3, a flow diagram illustrating a method 150 of maintaining peripheral device firmware versions in a data processing system according to one embodiment of the present invention is presented. In the depicted embodiment, the system BIOS is initiated (block 152) typically in response to a power-on, hardware reset event or a soft restart such as an operating system restart or entry of a specified keyboard combination (e.g., CntlAltDel). As part of its execution, BIOS identifies (block 154) each of the peripheral device adapters connected to the system's I/O bus (or busses) and initiates (block 156) the POST. As part of POST, system 100 determines (block 158) the firmware versions of each of the identified peripheral devices using a system call designed to enable adapters to report their firmware version levels.

The firmware version levels that are retrieved from the hardware devices themselves are then compared (block 160) to archived information indicating the currently approved or authenticated firmware versions levels for each peripheral device. In one embodiment, this archived information is stored in a partition (the service partition) of the system's DASD that is dedicated for containing firmware versions, device drivers, and the like. Because these software components are typically relatively small compared to the enormous capacity offered by state of the art disk devices, it is contemplated that the dedicated storage area will occupy only a small portion of the total disk space.

If the comparison between the installed firmware levels and the archived levels reveals (block 162) no firmware version mismatches, the BIOS executes an initial program load (IPL) to retrieve the necessary operating system components and the system assumes an operational state until the next boot event. If a mismatch is detected, action is then taken automatically to conform the hardware firmware version to the archived version. In the depicted embodiment, this corrective action includes booting into the service partition (block 164) where the archived firmware resides. The service partition may then validate the firmware levels of all devices against what they should be according to the archived information. This validation code will then force a firmware update (block 166) to the correct level stored on the service partition for any mismatched device to ensure that the firmware will match the driver version following a subsequent system boot. In the preferred embodiment, each update procedure that is executed is recorded (block 168) in a service partition log or IBM server event log that is accessible to management applications such as the IBM Director application identified by reference numeral 144. After the firmware is updated, a system reboot is executed (block 170).

When a firmware revision or update occurs, the newly revised firmware is imaged into the service partition using an update module identified by reference numeral 142 in FIG. 2. Update module 142 may comprise a module that is called by BIOS during a system boot so that the module can access service partition 124. Any software updates performed by update module 142 are also recorded in the service partition log accessible to management applications. It will be apparent to those skilled in the art having the benefit of this disclosure that the present invention contemplates a system and method for automatically maintaining firmware versions of peripheral devices in a data processing system. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of maintaining firmware revisions in a data processing system, comprising:

imaging the current firmware of at least one peripheral device associated with the system into a portion of non-volatile storage accessible to the a system;

during a boot sequence, comparing the firmware versions on each of the at least one peripheral devices to the corresponding versions imaged in the system's non-volatile storage; and responsive to detecting a mismatch between a device's firmware version and the corresponding imaged version, updating the firmware of the respective peripheral device to conform to the imaged version;

wherein imaging the current firmware includes partitioning the system storage into at least a user partition and a service partition and storing the firmware images in the service partition;

wherein the service partition is implemented according to the Protected Area Run Time Interface Extension Services (PARTIES) specification; and wherein updating the firmware includes booting into the service partition and using the service partition to validate the firmware versions of each of the peripheral devices.

2. The method of claim 1, wherein the service partition is inaccessible to the system's operating system and applications.

3. The method of claim 1, further comprising recording each updating of the firmware in a log that is accessible to management software.

4. The method of claim 1, wherein the peripheral devices include at least one device selected from a network interface device, a DASD controller, and a service processor.

5. A computer program product comprising a computer readable medium configured with computer executable instructions for maintaining firmware revisions in a data processing system, the computer program product, comprising:

computer code means for imaging the current firmware of at least one peripheral device associated with the system into a portion of non-volatile storage accessible to the system;

computer code means for comparing, during a boot sequence, the firmware versions on each of the at least one peripheral devices to the corresponding versions imaged in the system's non-volatile storage;

computer code means for updating the firmware of the respective peripheral device to conform to the imaged version responsive to detecting a mismatch between a device's firmware version and the corresponding imaged version; and code means for recording each updating of the firmware in a log that is accessible to management software;

wherein the code means for imaging the current firmware includes code means for partitioning the system storage into at least a user partition and a service partition and storing the firmware images in the service partition; and wherein the code means for updating the firmware includes code means for booting into the service partition and using the service partition to validate the firmware versions of each of the peripheral devices.

6. The computer program product of claim 5, wherein the service partition is inaccessible to the system's operating system and applications.

7. The computer program product of claim 5, wherein the service partition is implemented according to the Protected Area Run Time Interface Extension Services (PARTIES) specification.

8. A data processing system including at least one processor connected to a system memory and at least one peripheral device accessible to the processor, the system further comprising:

means for imaging the current firmware of at least one peripheral device associated with the system into a portion of non-volatile storage accessible to the system;

means for comparing, during a boot sequence, the firmware versions on each of the at least one peripheral devices to the corresponding versions imaged in the system's non-volatile storage; and means for updating the firmware of the respective peripheral device to conform to the imaged version responsive to detecting a mismatch between a device's firmware version and the corresponding imaged version;

wherein the means for imaging the current firmware includes means for partitioning the system storage into at least a user partition and a service partition and storing the firmware images in the service partition; and wherein the means for updating the firmware includes means for booting into the service partition and using the service partition to validate the firmware versions of each of the peripheral devices.

9. The system of claim 8, wherein the service partition is inaccessible to the system's operating system and applications.

10. The system of claim 8, wherein the service partition is implemented according to the Protected Area Run Time Interface Extension Services (PARTIES) specification.

11. The system of claim 8, further comprising means for recording each updating of the firmware in a log that is accessible to management software.

12. The system of claim 8, wherein the peripheral devices include at least one device selected from a network interface device, a DASD controller, and a service processor.

* * * * *